United States Patent
Collet et al.

(10) Patent No.: US 8,428,253 B2
(45) Date of Patent: Apr. 23, 2013

(54) METHOD FOR PROCESSING CONTENTS INTENDED FOR BROADCASTING

(75) Inventors: Jean-François Collet, Divonne-les-Bains (FR); Olivier Brender, Morges (CH)

(73) Assignee: Nagravision S.A., Cheseaux-sur-Lausanne (CH)

( * ) Notice: Subject to any disclaimer, the term of this patent is extended or adjusted under 35 U.S.C. 154(b) by 1712 days.

(21) Appl. No.: 11/578,465

(22) PCT Filed: Apr. 21, 2005

(86) PCT No.: PCT/IB2005/051302
§ 371 (c)(1),
(2), (4) Date: Oct. 13, 2006

(87) PCT Pub. No.: WO2005/104528
PCT Pub. Date: Nov. 3, 2005

(65) Prior Publication Data
US 2007/0237331 A1 Oct. 11, 2007

(30) Foreign Application Priority Data
Apr. 22, 2004 (CH) ........................................ 696/04

(51) Int. Cl.
*H04L 29/06* (2006.01)
(52) U.S. Cl.
USPC ................................ 380/43; 380/210; 725/31
(58) Field of Classification Search .................. 380/239, 380/210, 43; 725/31; 726/26
See application file for complete search history.

(56) References Cited

U.S. PATENT DOCUMENTS

| 6,898,285 | B1 * | 5/2005 | Hutchings et al. | 380/200 |
| 2003/0140340 | A1 | 7/2003 | Bertram | |
| 2003/0188154 | A1 * | 10/2003 | Dallard et al. | 713/153 |
| 2004/0083177 | A1 * | 4/2004 | Chen et al. | 705/50 |

FOREIGN PATENT DOCUMENTS

| EP | 1274243 | 1/2003 |
| WO | WO 02/058395 | 7/2002 |

OTHER PUBLICATIONS

International Search Report (PCT/ISA/210).
"Functional Model of a Conditional Access System". EBU Review—Technical, European Broadcasting Union. Brussels, BE, No. 266, Dec. 21, 1995, pp. 64-77.
"Encipherment and Conditional Access". L.C. Guillou et al. SMPTE Journal, vol. 103, No. 6, 99. 398-406, SMPTE Inc., Scarsdale, NY, Jun. 1, 1994.
"Encipherment and Conditional Access," by Louis Claude Guillou, SMPTE Journal 103 Jun. 1994, No. 6, pp. 398-406.

* cited by examiner

Primary Examiner — Hadi Armouche
Assistant Examiner — Virginia T Ho
(74) Attorney, Agent, or Firm — Harness, Dickey & Pierce, P.L.C.

(57) ABSTRACT

A processing method of content intended for broadcasting is disclosed. The method includes, preceding broadcasting: encryption of the content by a plurality of control words, reservation of locations intended to receive a control message in the encrypted content, marking of each location with location information in the content, and storage of a key file comprising the control words. During broadcasting, the method includes: transmission of the encrypted content to a video server, transmission of the key file to a control message generator, broadcasting of the content encrypted by the video server, interception of the video server output by a replacement module, detection, by the replacement module, of location information of control messages in the stream of the broadcasted content, and application of the control messages at locations provided for this purpose by the replacement module.

11 Claims, 2 Drawing Sheets

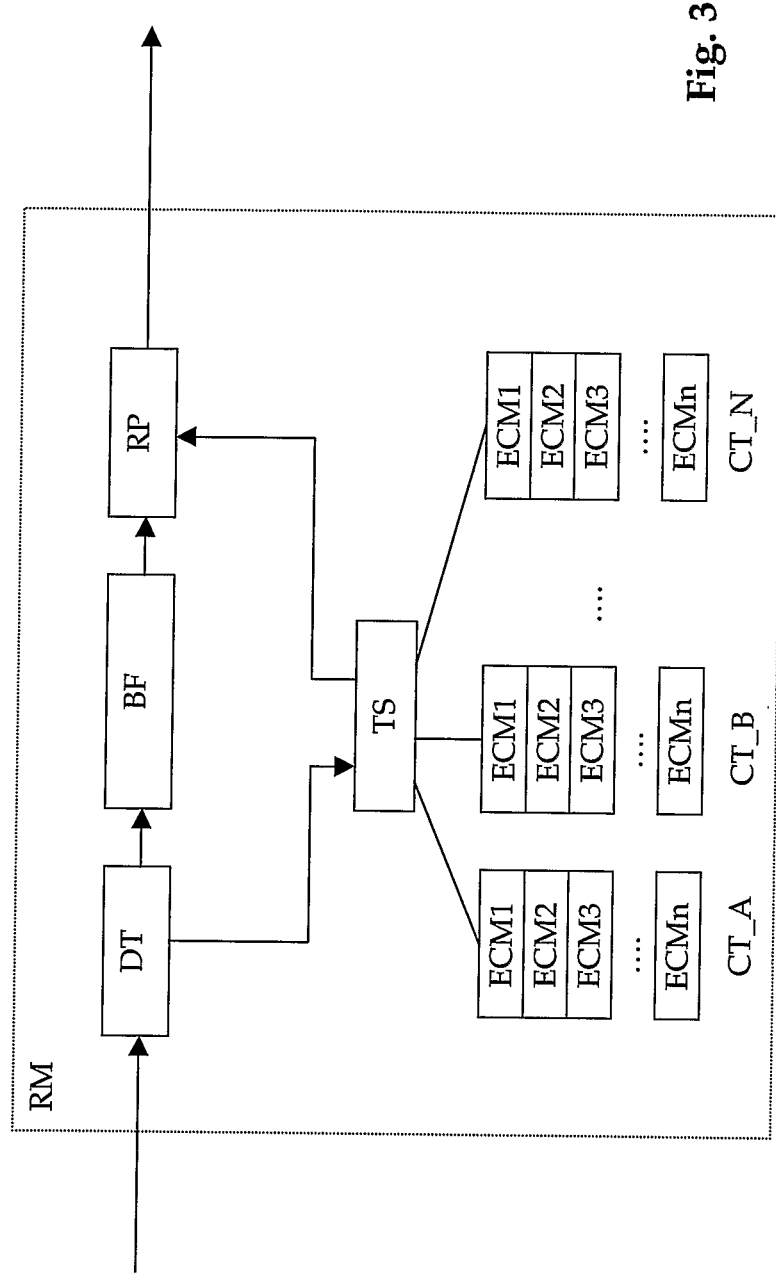

METHOD FOR PROCESSING CONTENTS INTENDED FOR BROADCASTING

BACKGROUND

1. Field

The present invention refers to the domain of the broadcasting of video content on request, in particular the domain of video servers.

2. Description of Related Art

The development of the request for the broadcasting of specific video products has opened a new market, thanks to the availability of increasingly larger bandwidths. Therefore, it is possible to broadcast a film to a user via his/her telephone line by using, for example, the DSL technique (Digital Subscriber Line). Today, speeds of approximately 2 to 3 Mbits/sec are possible.

With this aim in view, videos servers are capable of managing a large number of lines towards users, each line broadcasting a different content.

These servers have access to a lot of contents that represent huge storage capacities. These servers are managed by a management module that manage data relating to each user of the broadband lines and that processes authorization and invoicing data. This management module instructs the video server to inform it about which contents must be transmitted on each line.

Initially, these servers were designed for content in plaintext, that is to say not encrypted. Considering the addressee was clearly identified, the management of his/her account was carried out centrally by a management module and not locally on the user's decoder. The use of a broadcasted content is usually unique and copies are not authorized. The possibility of illicitly copying a content duly acquired by a user has forced the broadcasters to introduce a data protection layer using encryption.

As is well known, in order to be able to visualize content such as a film, a sports event or a game in particular, several streams are broadcasted that are destined for a multimedia unit, for example, a decoder. In particular, these streams are on one hand the file of the event in the form of an enciphered data stream and on the other hand a stream of control messages allowing the deciphering of the data stream. The content of the data stream is enciphered by "Control Words" (cw) that are renewed regularly. The second stream is called the ECM stream (Entitlement Control Message) and can be formed in two different ways. According to a first method, the control words are enciphered by a key, called a transmission key TK, that generally pertains to the transmission system between the management centre and a security module associated to the receiver/decoder. The control word is obtained by deciphering the control messages by means of the transmission key TK.

According to a second method, the ECM stream does not directly contain the enciphered control words, but rather contains the data allowing the determination of the control words. This determination of the control words can be carried out using different operations, in particular by means of deciphering, said deciphering being able to lead directly to the control word which corresponds to the first method described above, but said deciphering also being able to lead to data which contains the control word, the latter must also be extracted from the data. In particular, the data can contain the control word as well as a value associated to the content to be broadcasted and notably the access conditions to this content.

Another operation allowing the determination of the control word can use, for example, a simplex hashing function of this information in particular.

In both cases, a date field allowing the management of the usage period of this content is added to the control message ECM.

In order to allow the broadcasting of an encrypted content, the content in plaintext is transmitted to an encryption module that will return two files, both encrypted content and a file containing the group of encryption keys (control words).

In order to transform a video server broadcasting the content in plaintext into a server broadcasting the encrypted content, it must carry out numerous operations as follows:
  transmit the control words to an ECM generator, the latter will add the date and possibly the access conditions to the content,
  receive the ECM in return,
  synchronize the broadcasting of the ECM with the broadcasting of the content.

These operations are certainly possible, but entail extensive development times and the particular behaviour of the video server, behaviour that can be specific to each operator responsible for security.

The documents EP 1 274 243 and US 2003/0140340 perfectly illustrate these problems. In fact, the content is pre-encrypted and broadcasted on request. During such a request, the ECM stream is prepared and transmitted at this moment. The server VOD is always associated to these operations and is responsible for broadcasting the ECM with the pre-encrypted content. The two streams, the ECM and the content, are independent from each other and are processed separately.

The aim of this invention is to propose a flexible and undemanding solution to secure the content transmitted by videos servers towards one or more users.

SUMMARY

This aim is achieved by a processing method of content intended for broadcasting, this method comprising the following steps preceding broadcasting:
  encryption of the content by a plurality of control words (cw),
  reservation of locations intended to receive a control message (ECM) in the encrypted content,
  marking of each location with location information in the content,
  storage of a key file comprising the control words,
and during broadcasting:
  transmission of the encrypted content to the video server,
  transmission of the key file to a control message generator,
  broadcasting of the content encrypted by the video server,
  interception of the video server output by a replacement module,
  detection, by the replacement module, of location information of control messages in the stream of the broadcasted content,
  application of the control messages (ECM) at locations provided for this purpose by the replacement module.

The important point in this method is the preparation of the pre-encrypted content by leaving the locations empty for future control messages ECM. This characteristic is not disclosed in the documents of the prior art. Furthermore, this allows the processing of the stream of the pre-encrypted content directly during broadcasting in a module completely independent of the broadcasting server itself.

Thanks to this method, it is considered that the video server is not concerned at all with security issues and that it only broadcasts the content. Since a place is provided in the content to insert the control messages, the latter are prepared during broadcasting and are inserted into the stream on the fly.

Each location reserved in the content includes an index that allows the retrieval of the control message that will be replaced at this point, taking into account the control words in force at this moment.

In fact, it is important that the control words are placed in the correct place so that they are synchronized with the content.

BRIEF DESCRIPTION OF THE DRAWINGS

The invention will be better understood thanks to the following detailed description that refers to the enclosed drawings that are given as a non-limitative example, in which:

FIG. 2 shows a replacement message,

FIG. 3 shows the detail of the replacement module.

DETAILED DESCRIPTION OF EXAMPLE EMBODIMENTS

Figure 1:
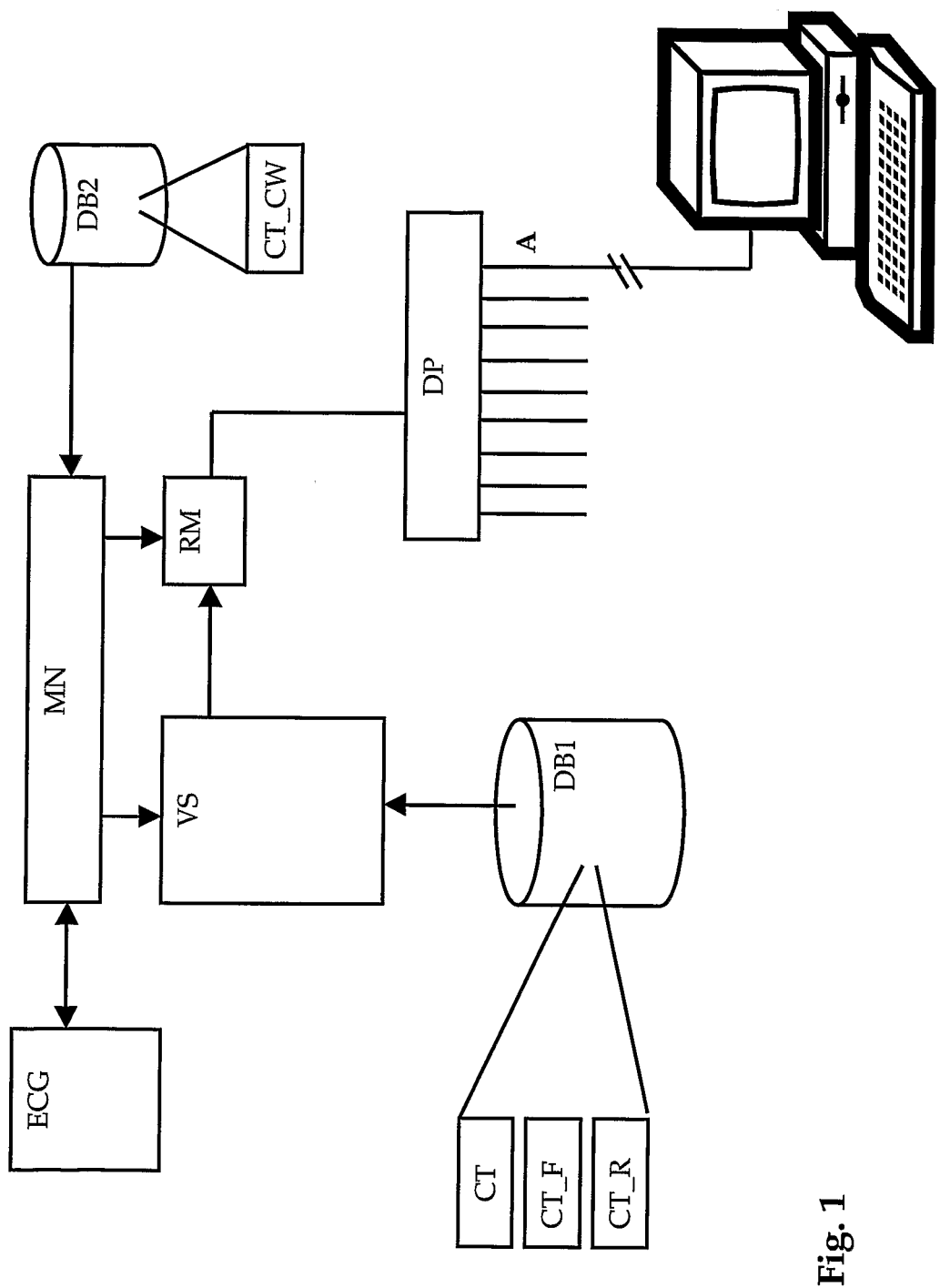
FIG. 1 shows the different modules of the invention.

As shown in FIG. 1, the video server is the central part of this unit. It is directly linked to its auxiliary memory DB1 that can be of several types such as tapes, optical disks or hard disks. It generally has access to the equivalent of a jukebox with all the contents (films) proposed for broadcasting.

The management module MN is responsible for the management of the group. It receives the requests of users, determines their rights and deals with invoicing. Furthermore, once a user request is accepted, it informs the server VS of the content CT to be broadcasted and the transmission identifier. According to our example, the key file CT_CW is stored in a database DB2 associated to the management module.

Likewise, the manager MN will transmit the key file CT_CW to the generator ECG of control messages. This generator is responsible for receiving a control word CW and preparing a message ECM. It should be noted that the control word CW is preferably stored in the encrypted form and that only the generator ECG has the key to decipher the control word CW as well as the key necessary for the preparation of a control message ECM.

The message ECM preferably includes the actual date and other useful data such as the identifier of the addressee, for example. It is possible to add a personalized encryption to the control word CW to take into account a personal and unique key at the receiver. In this case, the manager MN indicates the unique number of the receiver so that the message generator can find the personal key of this receiver.

This message is then transmitted to the replacement module RM that is placed precisely at the outlet of the video server. This module is also informed of the identifier of the user or of the broadcasting line in order to be able to distinguish the data intended for a user.

The functioning of this replacement module RM, although simple, requires high computer performances. In fact, the video server output can reach high speeds due to the fact that the server can broadcast towards a large number of users at the same time.

The role of the replacement module RM is to scan the stream leaving the server and detect the locations of control messages ECM. In order to simplify the replacement work, the size of the locations is the same as the control messages.

Once such a location is detected, the control message replaces the mark. In a different embodiment, the mark is independent of the location provided for the control message. A characteristic of the invention is that the size of the data to be broadcasted does not vary, only an empty location is filled during broadcasting.

The module RM is placed here on the outlet of the video server that is common to several users. According to another embodiment, it can be placed at the outlet of the multiplexing module DP at the level of each user group.

According to a simplified embodiment, the control message ECM contains the control word CW and the current date. It is thus independent of the final addressee.

The replacement module RM scans the stream exiting the video server and detects the locations for control messages. In the case where the module RM is placed in the stream common to several users, there are two means to determine the control words that are destined to be replaced at a given place. According to a first means, the locations are numbered consecutively without relating to the content. The manager MN informs the module RM that the stream relating to exit A of the demultiplexer DP relates to the group of control words CW_A. The module will thus detect two parameters, both the identifier of the final user (exit A in our example) and the location of the control message.

According to another embodiment, the location for the control message includes two parameters, namely the index of the control word CW and an indication identifying the content. In fact, each content CT is identified by a unique identifier. At the time of activation, carried out by the manager MN, of the broadcasting of a content CT, the manager communicates not only the file of the control messages ECM, but also the identifier of the content to the replacement module.

Therefore, the latter only has to detect the locations of control messages and thanks to the identifier it will allow the correct table of control messages to be marked off.

The composition of a reserved location is shown in FIG. 2. A first field TG identifies this type of location. There is in fact a location mark. The following field CT_ID indicates the content identifier CT. It allows a link to be made with the group of control words CW. The latter field is the index ECM_ID of the control word in progress. It determines which control word is currently in use and which is the next control word. According to this example, provision is made to replace this reserved location using the control message at the time of broadcasting. This is because a field AD adjusts the size so that the location has the same size as the control message.

It is to be noted that a control message contains two control words, the current word as well as the next control word in order to allow an automatic transition during the changing of the control word.

With reference to FIG. 3, the message ECM1 will contain the words CW1 and CW2, the first word CW1 being the word currently in use and CW2 is the word active during next cryptoperiod. In the same way, the message ECM2 will contain the word CW2 and CW3.

The identifier CT_ID of the content allows the module TS to select the correct message table. According to our example, the detection module captures the content identifier CT_ID and the message index, these two items of information allowing the pointer of the table TS to determine the correct content (CT_A, CT_B ... CT_N) and return the correct message. This message is transmitted to the substitution module RP that replaces the replacement message by means of the message ECM and thus the stream can be broadcasted. An optional delay module BF is placed between the two modules in order to allow the operations described above to be carried out. In practice, this delay is short, lasting just a few microseconds.

In the case of fast forward or rewind, certain cautions must be taken, in particular with regard to fast rewind.

In fact, according to the principle that each message includes the current word and the subsequent word, in the case of backtracking, it will be able to transmit the current word and the previous word.

According to the example disclosed in FIG. 1, three contents are pre-encrypted, namely the complete content CT, the content in fast forward CT_F and the contents in fast rewind CT R. If the processing of the normal and fast content responds to the same criteria, the fast rewind content CT_R is different since the message index ECM_ID is lower than 1 with respect to the other contents. For the cryptoperiod 10, for example, it would transmit the ECM index 9 that includes CW word 9 and CW 10.

In the normal case (contents CT or CT_F), the same cryptoperiod will be associated to the ECM message 10 that includes control word CW 10 and control word CW 11 related to the next cryptoperiod.

For video servers that do not have access to content specific to fast forward and fast rewind operations, it is important that the replacement module RM receives the information of the direction in order to operate automatically the following operation:
If Direction="Rewind" then ECM=ECM(ECM_ID-1)
if not, ECM=ECM(ECM_ID).

According to a simplified method of the invention, the control messages ECM are transmitted in plaintext. It is desirable only to encrypt (or mix) each control word with a key pertaining to the receiver. One can therefore imagine simple receivers, without security modules, but which have a unique key in the decoder part. Each control word is encrypted by this unique key. The replacement module will thus not insert into the stream a control message, but rather the current control word encrypted by the unique key of the receiver.

The invention claimed is:

1. A method of processing content that is broadcast, the method comprising:
   prior to broadcasting:
      encrypting the content using a plurality of control words,
      reserving a plurality of locations in the encrypted content, each location having a location size and each location being suitable for receiving a control message, said control message having a control message size,
      creating a mark at each reserved location in the encrypted content, said mark including a location information, the location size of the marked location being equivalent to the control message size, and
      storing a key file including the control words, and
   at a time of broadcast, the method including:
      transmitting the encrypted content to a video server,
      transmitting the key file to a control message generator,
      generating, in the control message generator, a plurality of control messages based on at least the control words from the key file,
      broadcasting, by the video server, a stream including the encrypted content,
      intercepting the broadcast stream using a replacement module,
      detecting, by the replacement module, at least one of the plurality of reserved locations in the broadcast stream, and
      inserting, by the replacement module, the control messages in the at least one detected location of the plurality of reserved locations.

2. The method according to claim 1, wherein the location information includes a description of the content.

3. The method according to claim 2, wherein the location information includes an index of the control word used at the location.

4. The method according to claim 2, wherein the replacement module has access to a plurality of control messages associated withte different contents, and wherein the replacement module extracts, from the marked location, the identifier of a currently processed content and selects the control messages relative to said content.

5. The method according to claim 2, wherein the broadcasting is dedicated to a specific receiver, said receiver having a unique key, the replacement module executing the step of encrypting the control word with the unique key of the receiver and applying the encrypted control word in lieu of the control message.

6. The method according to claim 1, wherein the location information includes an index of the control word used at the location.

7. The method according to claim 3, wherein the replacement module has access to a plurality of control messages associated with different contents, and wherein the module extracts, from the marked location, the identifier of the currently processed content and selects the control messages relative to said content.

8. The method according to claim 6, wherein the broadcasting is dedicated to a specific receiver, said receiver having a unique key, the replacement module executing the step of encrypting the control word with the unique key of the receiver and applying the encrypted control word in lieu of the control message.

9. The method according to claim 1, wherein the replacement module has access to a plurality of control messages associated with different contents, and wherein the replacement module extracts, from the marked location, the identifier of a currently processed content and selects the control messages relative to said content.

10. The method according to claim 9, wherein the broadcasting is dedicated to a specific receiver, said receiver having a unique key, the replacement module executing the step of encrypting the control word with the unique key of the receiver and applying the encrypted control word in lieu of the control message.

11. The method according to claim 1, wherein the broadcasting is dedicated to a specific receiver, said receiver having a unique key, the replacement module executing the step of encrypting the control word with the unique key of the receiver and applying the encrypted control word in lieu of the control message.

* * * * *

UNITED STATES PATENT AND TRADEMARK OFFICE
CERTIFICATE OF CORRECTION

| | | |
|---|---|---|
| PATENT NO. | : 8,428,253 B2 | Page 1 of 1 |
| APPLICATION NO. | : 11/578465 | |
| DATED | : April 23, 2013 | |
| INVENTOR(S) | : Collet et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1825 days.

Signed and Sealed this
Sixteenth Day of December, 2014

Michelle K. Lee
*Deputy Director of the United States Patent and Trademark Office*